United States Patent [19]
DeVoe

[11] Patent Number: 5,089,123
[45] Date of Patent: Feb. 18, 1992

[54] APPARATUS FOR CONTINUOUS REMOVAL OF MATERIALS FROM A LIQUID

[75] Inventor: Irving W. DeVoe, Camarillo, Calif.

[73] Assignee: Metanetix, Inc., Camarillo, Calif.

[21] Appl. No.: 408,156

[22] Filed: Sep. 14, 1989

[51] Int. Cl.$^5$ ............................................ B01D 15/02
[52] U.S. Cl. .................................. 210/189; 210/194; 210/287
[58] Field of Search ............... 210/189, 194, 196, 263, 210/272, 287

[56] References Cited

U.S. PATENT DOCUMENTS

| | | | |
|---|---|---|---|
| 238,194 | 2/1881 | Winterhalter . | |
| 674,353 | 5/1901 | Durant . | |
| 2,197,770 | 4/1940 | Pruyn | 210/189 |
| 2,983,378 | 5/1961 | Hilkemeier | 209/270 |
| 3,031,807 | 5/1962 | Bylsma et al. | 51/164 |
| 3,158,255 | 11/1964 | Schnyder | 198/215 |
| 3,351,181 | 11/1967 | Allen et al. | 198/215 |
| 3,498,839 | 3/1970 | Mehta | 134/25 |
| 3,644,103 | 2/1972 | Yoon et al. | 210/189 |
| 4,014,431 | 3/1977 | Angeletti et al. | 198/660 |
| 4,103,605 | 8/1978 | Hemborg et al. | 99/345 |
| 4,125,437 | 11/1978 | Bacon | 202/117 |
| 4,156,392 | 5/1979 | Bayeh | 110/110 |
| 4,220,242 | 9/1980 | Forsberg | 198/666 |
| 4,261,816 | 4/1981 | Beck et al. | 209/284 |
| 4,343,394 | 8/1982 | Emmert et al. | 198/616 |
| 4,472,272 | 9/1984 | Capannoli | 209/268 |
| 4,538,767 | 9/1985 | Pimley | 241/79.3 |
| 4,717,014 | 1/1988 | Ekelund | 198/518 |
| 4,719,933 | 1/1988 | Jackson | 134/65 |

*Primary Examiner*—Ivars Cintins
*Attorney, Agent, or Firm*—Nilsson, Robbins, Dalgarn, Berliner, Carson & Wurst

[57] ABSTRACT

Methods and apparatus for continuous separation and optional recovery of one or more contaminants from a liquid, and in particular, for isolation of one or more specific elements, isotopes, ions, complexes and/or compounds from mixtures of similar or dissimilar materials, whereby the liquid containing such mixture is treated continuously, and the thus-isolated material may if desired be economically recovered. Through the use of means for continuously moving an affinity medium in a direction countercurrent to the flow of a liquid containing the material to be isolated, it is possible to obtain contaminant removal efficiencies comparable or superior to what would be obtained with heretofore known methods, and to achieve selective removal of one or more contaminants from a mixture. The affinity medium is selected on the basis of its ability to form an association with one or more of the components of the mixture being treated. In a preferred embodiment of the invention, the continuous countercurrent movement of medium relative to liquid is effected through the use of a helicoidal screw inside a conduit.

8 Claims, 2 Drawing Sheets

APPARATUS FOR CONTINUOUS REMOVAL OF MATERIALS FROM A LIQUID

BACKGROUND OF THE INVENTION

This invention relates to methods and apparatus for continuous separation and optional recovery of one or more components of a mixture from a liquid containing the mixture. In particular, the present invention is directed to apparatus and methods for isolation of one or more specific elements, isotopes, ions, complexes and/or compounds from mixtures of similar or dissimilar materials in a manner such that the liquid containing such mixture is treated continuously, and such that the thus-isolated material may if desired be economically recovered.

In co-pending application Ser. No. 07/316,201 filed Feb. 24, 1989, the entire disclosure of which is hereby incorporated by reference, a continuous process for treatment of liquids to remove contaminants therefrom is disclosed. The process comprises a series of discrete liquid treatment stages, in each of which a portion of the liquid is maintained in contact with contaminant removal medium for a predetermined residence time, for example in a sequence of containers.

Movement of all or a portion of the medium used in each treatment stage is generally carried out in a batchwise manner sequentially from container to container.

The flow of liquid in a countercurrent direction may be batchwise or continuous, and is regulated through the use, for example, of weirs positioned between adjacent containers so as to achieve the desired liquid residence period in each container. The flow rate of the incoming waste stream into the treatment system is adjusted with reference to the concentration of contaminant(s) to be removed therefrom and the concentration (volume/volume) of medium in each treatment container so that equilibrium conditions are attained in each discrete container prior to advancing the liquid to the next stage in the cycle. To accommodate influent with particularly high contaminant concentrations or pH values at the extreme ends of the scale, it may be necessary to employ systems wherein the residence times of liquid and of medium in each container are fairly extended. Moreover, because operation of the system is based on the attainment of equilibrium conditions in each container, where the efficiency of contaminant removal using any given medium is low the desired degree of contaminant removal may only be achieved by cycling the liquid through a substantial number of treatment stages. Each container is contemplated as having a fairly large liquid capacity (on the order of at least 1 m$^3$); thus, a requirement for multiple cycles to achieve the desired degree of contaminant removal necessitates the use either of a substantial number of containers (increasing apparatus cost significantly) or of repetition of the entire treatment in the same system (reducing efficiency of treatment). While no limits are set as to the number of containers in any given system, the exemplary embodiment described comprises 8 tanks, only 4-6 of which are generally dedicated to contaminant removal.

In any event, the process of Ser. No. 07/316,201 is most effective for removal of essentially all contaminants of a given type (for example, metal ions or organic compounds) essentially without selectivity for a particular contaminant. For example, using an ion exchange medium, it is quite practical to remove essentially all metal ions from an aqueous solution upon completion of a typical treatment regimen; on the other hand, it is significantly more difficult in such a multiple container system to achieve selective removal of a single metal ion from a mixture thereof. Therefore, while the process of Ser. No. 07/316,201 provides substantial advantages over known methods for removal of a wide variety of contaminants from liquids, it does not provide an adequate solution in those situations where available media show a relatively low affinity for a particular contaminant and/or selectivity with respect to removal or recovery of a particular material is desired.

SUMMARY OF THE INVENTION

According to the present invention, it has been determined that essentially continuous treatment of a liquid to remove one or more contaminants therefrom may be achieved without the need to establish the fairly large-scale equilibrium systems in a series of discrete containers which would characterize the method of Ser. No. 07/316,201. Rather, through the use of means for continuously moving an affinity medium in a direction countercurrent to the flow of a liquid containing the material to be isolated, it is possible to obtain contaminant removal efficiencies comparable or superior to what would be obtained with a large multi-container system and/or several repetitions of the container treatment regimen and/or with a moving packed bed which can clog with particulates or compact, thereby restricting the water flow.

The affinity medium is chosen on the basis of its ability to form an association with one or more of the components of the mixture being treated. In this context association is any physical and/or chemical interaction such that the component to be removed from the liquid has a substantially higher probability of being associated with the affinity medium rather than remaining in the liquid when the medium and the liquid are separated. In many instances, this affinity is based on some combination of attractive forces greater than those forces tending to keep the material in solution or suspension in the liquid, resulting in a binding of the component to the medium. Such attractive forces include ionic, chelating, hydrophobic, solvation, Van der Waals, hydrogen bond and others. For a particular agent to be useful as an affinity medium, the sum total of these attractive forces between the agent and the material to be isolated must be greater than the analogous forces tending to keep the material in solution or suspension in the liquid, as well as any forces tending to keep the material in complexed form or otherwise associated with additional components of the mixture.

DETAILED DESCRIPTION OF THE INVENTION

In accordance with one aspect of the present invention, the affinity medium effectively absorbs one or more components of the mixture from the liquid. Depending on the nature of the material and the medium, this absorption may involve binding (e.g., ionic bond formation between charged particles), complexing or chelation (e.g., interaction of an organic chelator with metallic ions). Generally, the contaminant affinity medium is provided in a particulate form which permits subsequent recovery of the contaminant-depleted liquid by filtration, decanting, or other simple means of liquid/solid separation.

The removal of one or more contaminants from a liquid may be effected by a countercurrent flow of the liquid relative to a medium having an affinity for the contaminant(s) in a manner similar in principle to that employed in a process as disclosed in Ser. No. 07/316,201. In accordance with this aspect of the invention, the medium is introduced into the system in an essentially "unloaded" state. This "fresh" medium is capable of accommodating a predetermined amount of one or more contaminants through the formation of some type of thermodynamically favored association therewith, as previously described. By virtue of a reduction in the free energy of the medium/liquid system whenever such an association is formed, the system is thermodynamically driven towards an equilibrium condition wherein the number of contaminant/medium associations is maximized. During the course of treatment of the liquid, available sites on the medium for association of contaminant(s) therewith are thus progressively occupied until no such sites remain for additional contaminant; at this point, the medium is fully "loaded" therewith.

This type of treatment scheme is similar to that contemplated in Ser. No. 07/316,201, as in both instances there is an essentially non-selective removal of all contaminants having affinity for the medium up to the point where the medium is fully loaded. Thus, under conditions where the number of available sites for formation of an association between medium and contaminant(s) is equal to or greater than the contaminant concentration, both methods are effective to achieve the desired removal of contaminants from a liquid.

Nonetheless, the present invention may in some situations provide significant advantages over the method of Ser. No. 07/316,201. The contemplated continuous counterflow both of liquid and of medium creates in effect a continuous series of "mini-equilibria" as progressively less contaminant-laden liquid contacts progressively more active medium. In contrast to a system wherein there is a limited number of stages at which the liquid/medium combination is allowed to reach a steady state, according to the present invention there is a dynamic interaction between contaminant and affinity medium at virtually every encounter on the molecular level as counterflow progresses. Thus, the efficiency with which a given affinity medium removes contaminants may be substantially higher in a system in accordance with the present invention, because the contemplated continuous counterflow creates conditions comparable to systems involving a very large number of individual larger-scale treatment cycles. In this manner, solutions containing higher concentrations of contaminant than may reasonably be handled in a container system can be accommodated. Moreover, media that would not have a sufficiently high affinity for contaminant to make their use practical in a system comprising a limited number of discrete containers would be suitable for use in accordance with the present invention.

By selection of appropriate operating parameters, contaminant removal from a liquid to a degree equivalent or superior to that achieved in accordance with the teachings of Ser. No. 07/316,201 may be routinely effected by exploitation of a system of continuous movement of medium in a direction countercurrent to the flow of the liquid. Moreover, this continuous relative movement of medium and liquid may conveniently be effected in apparatus which is smaller in scale for equivalent treatment efficiency and in some respects even easier to operate than is the case with the corresponding equipment in accordance with Ser. No. 07/316,201. Therefore, in accordance with this first aspect of the invention, the equivalent of a large number of "mini-containers" pursuant to the teachings of Ser. No. 07/316,201 is provided for maximum medium loading efficiency.

In accordance with another aspect of the present invention, the selective recovery of one or more specific materials from a mixture of similar or different materials is also readily and routinely achieved by continuous counterflow of both liquid and medium. This desired separation of one or more components of a mixture from other components therein is effected by exploiting differences in the relative affinities of the various components for the affinity medium.

For any given affinity medium, there is essentially a hierarchical relationship among the components of the mixture, whereby a given component will have the highest affinity for the medium, a second component the next highest, and so on until there is at least one component having a lowest level of affinity among the components of the mixture for the particular medium. In the case where all components of the mixture are present in the same concentration, under saturation conditions those components having the highest affinities are more likely to remain associated with the affinity medium to the greatest extent; in competition for available affinity sites on the medium, free energy considerations dictate that the high affinity contaminant/medium association be formed preferentially over the low affinity contaminant/medium association. As a consequence, when the solid medium is separated from the liquid after equilibrium, a greater proportion of the high affinity component is removed from the liquid by virtue of its association with the affinity agent than is the case with other, lower affinity components.

According to the present invention, by bringing the affinity medium into repeated contact with the liquid as it flows continuously in a direction countercurrent to the movement of the medium, there is effectively achieved a multiplication of affinity differences among components of a mixture being treated, such that separation of the component(s) having the highest affinity for the medium may be efficiently and reproducibly achieved. This is the case even when the difference(s) in relative affinity would be insufficient to permit such separation by conventional means, such as column chromatography or a multiple container system on a practical scale. Moreover, by further exploitation of the novel counterflow techniques of the present invention, it is possible to devise a subsequent medium regeneration program wherein the component removed from the mixture by the affinity medium is recovered in a purified and concentrated form through simple treatment methods.

By virtue of the countercurrent flow of liquid relative to medium, a given particle of fresh affinity medium is first brought into contact with liquid that has already previously encountered other particles of medium. In the course of each such prior contact, equilibrium conditions between the affinity medium and the liquid with which it is in contact are approached by the formation of associations between còntaminant(s) in the liquid and available sites on the affinity medium. Fresh affinity medium, on account of the underlying counterflow principle of the invention, is introduced at or near a point where treated liquid leaves the system. This fresh medium contacts liquid already substantially depleted of contaminant(s) with the highest affinity for the medium due to earlier counterflow contacts with medium in the system. Thus, associations are formed between the fresh medium and any remaining contaminants in the already substantially treated liquid.

As the relative affinity of each component of the mixture for the affinity medium reflects the strength of the association formed between each such component and the medium, the formation and maintenance of associations between the medium and the component(s) with the highest affinity for the medium is favored whenever there is a competition among mixture components for available sites on the medium. During each contact subsequent to the introduction of fresh medium and its initial loading by formation of reversible associations with contaminant(s) in the already substantially treated liquid, a component having higher affinity for the medium encountered further upstream in the liquid flow may in effect either "displace" another molecule of the same component (whereby there is no net change in the loading distribution on the medium) or a molecule of a component having a lower affinity (thereby effectively increasing the concentration of that high affinity component on the medium). On the other hand, a lower affinity component does not form as strong an association with the medium as does the high affinity component; as a consequence, the displacement of a high affinity component by one with lower affinity is not thermodynamically favored and is less likely to occur.

There is accordingly a net overall displacement of lower affinity component(s) associated with the medium early on in its counterflow through a treatment system in accordance with the present invention by component(s) having a relatively higher affinity for the medium as it continues its traversal of the system towards its ultimate removal at or near a point where the liquid to be treated is introduced. Fresh medium brought into contact with liquid containing a mixture of components having different affinities for the medium will be "loaded" with the components (i.e., components having some affinity for the medium will associate therewith) to the extent that these components are present in the liquid and the medium has loading sites suitable to accommodate such components. During its progress in a direction countercurrent to the flow of liquid, the medium is continuously brought into contact with liquid having progressively higher concentrations of the relatively higher affinity component(s); it is the concentration gradient of each higher affinity component which results in displacement of lower affinity materials.

In a simple case where there are only two components and a first component A has a higher affinity for the medium than a second component B, the medium is loaded on initial contact with the mixture preferentially by A. To the extent that A does not saturate the medium, the remaining unloaded portion of the medium associates with the lower-affinity B component. During the course of subsequent medium contacts with mixtures of A and B, by virtue of its higher affinity A displaces medium-associated B, which in turn is released to the liquid and continues downstream in the process. Ultimately, any B initially associated with the medium is replaced over a sufficient number of such contacts by the higher-affinity A component, assuming that the number of available loading sites on the medium is not so large as to preclude efficient displacement within the operating parameters of the system. At this point, the affinity medium is "selectively" loaded with A. Moreover, the liquid treated in accordance with the invention is effectively enriched in the lower affinity component B.

As discussed in Ser. No. 07/316,201 and as exploited in this invention as well, a particular advantage of medium counterflow methods is that they permit maximum exploitation of medium capacity. Thus, in the case where a non-selective removal of contaminants is desired, the present invention calls for introduction of fresh medium having the greatest number of sites available for loading when the liquid already has substantially all of the contaminants depleted therefrom, and therefore high medium activity is crucial (as is also true in accordance with Ser. No. 07/316,201). In the case of selective recovery, fresh medium enters the system after the highest-affinity components have already been substantially removed by prior contacts with medium. The fresh medium has a very high activity and associates quite efficiently with whatever limited amount of high affinity component remains in the solution; because whatever fraction of the component is not removed at this late stage would be lost to the effluent from the system, it is particularly useful to maximize medium activity. In this manner, the present invention also takes advantage of the high activity of the medium at the stage in a selective separation where it is most needed (i.e., where the concentration of the high affinity component is lowest) for optimum overall selective contaminant removal.

By the time the medium has progressed through the system to the location where the liquid being treated is introduced, substantially all low affinity components have been displaced by high affinity components. Whereas the fresh liquid has the highest concentration of the high affinity component, and thus is at its most effective displacement capacity, the medium is essentially fully loaded with that high affinity component and there are the fewest remaining low affinity associations requiring displacement. Therefore, the present invention also takes optimal advantage of the contaminant concentration gradient(s).

According to yet another aspect of the invention, it is even possible under certain circumstances to achieve the separation of components in a mixture in the absence of any difference in relative affinity. For example, in accordance with this aspect of the invention, one isotope of an element may be selectively removed from a mixture of isotopes, or the relative concentration of one isotope increased or reduced as a result of a counterflow treatment in accordance with the instant invention. Similarly, compounds or ions among which there is effectively a negligible affinity difference may nonetheless be separated (to the extent of an increase or reduction in concentration) by virtue of the present invention.

This aspect of the invention is of particular utility in those cases where the concentration of one component X in a mixture is very much greater than the concentration of a second component Y. If the medium is introduced into the system preloaded with X, it is possible to exploit the inability of the system to distinguish between X and Y so as to delay the removal of Y from the system. Whereas each contact of X-loaded medium with a molecule of X results in a net time delay of zero, an encounter with Y releases X to the liquid and delays the exit of Y from the system until it in turn is dislodged from the medium. In every encounter of the medium with the mixture of X and Y, the statistical probability of contact with X is greater than with Y; thus, any Y that is picked up by the medium is likely to be dislodged therefrom before the medium exits the system. The net result of these factors is that the progress of Y out of the system, both in the effluent liquid and on the medium, is delayed by proper selection of operating parameters so as to take the delay factor based on concentration differences into account.

As an essential feature of this invention is continuous counterflow of a solid medium relative to a liquid, any apparatus which enables the establishment of such a counterflow whereby the requisite contact parameters are achieved is within the scope of the invention. While in theory it is possible to use a large number of individual containers (for example, of the type contemplated in Ser. No. 07/316,201) in sequence to achieve the desired multiplicity of "mini-equilibria" and thereby set up competing concentration gradients, in practice such an arrangement would be too cumbersome to have substantial practical value. Accordingly, for most purposes, it is desirable to employ means for movement of medium in a first direction coupled with liquid conduit means arranged to permit liquid flow in a second, opposite direction. For example, medium could be moved by a conveyor belt submerged in a trough for liquid flow; a suitable incline of the trough would result in a flow of liquid countercurrent to the direction of movement of the belt.

In a preferred embodiment of the invention, the continuous countercurrent movement of medium relative to liquid is effected through the use of a helicoidal screw inside a conduit, forming a so-called "screw pipe" or "screw tube." The center of the helical coil may be void from end to end, or it may be solid. Throughout the length of the conduit, the external circumference of the helical coil contacts the internal surface of the conduit, whereby a continuous path is formed from one end of the conduit to the opposite end. Pursuant to one embodiment of this screw tube, the helical coil is attached to the internal surface of the conduit, and the tube is rotated. Pursuant to an alternative embodiment, the tube is stationary; the helical coil is designed to rotate, while maintaining a close seal along the internal circumference of the tube. The number of turns in the helical coil and the angle of the helix may be varied within a fairly wide range, depending upon a number of factors which will be hereinafter discussed.

The pipe is generally maintained at an angle of between about 0° and about 45°; for most practical purposes, the angle of tube incline is set within the range of about 4° to about 20° from the horizontal. Thus, the positive component of liquid flow is determined by the initial influent rate, and is generally further accelerated by gravitational forces.

Viewed from the perspective of liquid flow from one end (the proximal end) to the other (the distal end), each turn in the helical coil presents a flow barrier, over which the liquid cascades in an essentially continuous manner. Resistance to flow is thus provided by each surface portion of the helical coil which the liquid encounters along the length of its path towards the distal end.

Simultaneously with the introduction of liquid into the tube at the proximal end thereof, medium is introduced into the system at the distal end of the tube and moved towards the proximal end (i.e., in a direct countercurrent to the flow of liquid) by means of a relative rotation of the helical coil. The rate of movement of the medium through the system is essentially determined by the number of turns of the helical coil in a given length of the conduit and by the rate of conduit rotation. In general, it has been found that tube rotation rates on the order of about 0.1 to about 10 rpm are effective to achieve the desired relative movement of medium countercurrent to the flow of liquid and to balance any tendency of the liquid flow to cause a backwash of medium in the tube. Upon completion of its traversal of the system, the medium is then removed from the system at the proximal end of the conduit.

The screw tube embodiment of the invention provides the particular advantage that each section (i.e., each turn of the helical coil) acts essentially independent of every other section. In this sense, the screw tube may be considered to behave as a series of separate treatment beds. The number of turns of the helical coil in a given embodiment may range from a minimum of two to 48 or more in a single unit. In general, it has been determined that 12 to 36 turns of the helical coil are sufficient for optimal results for a wide range of effluent concentrations and selections of medium. The number of turns of the helical coil is dictated primarily by two factors: physical limitations on the number of turns that can be accommodated practically in a given length of pipe; and process limitations on the number of turns required to accomplish the desired degree of contaminant removal.

The volume of medium contained in each turn of the screw tube for optimum results is in turn determined by the concentration of contaminant(s) in the influent, as are the rate of rotation of the tube and the influent flow rate. In terms of the volume/volume ratio of medium to liquid, it has been found that there is a practical minimum of approximately 5% medium and a practical maximum of approximately 77% medium in most systems under typical operating parameters. In the treatment of a liquid from which one or more contaminants are to be removed without any considerations as to selectivity (for example, removal of all metals from an aqueous solution), it is generally desirable for purposes of efficiency to employ a maximum liquid flow rate and a minimum amount of medium; the rotation rate is adjusted to ensure the desired degree of contaminant removal.

In practice, maximum liquid flow rate through the tube is limited by the maximum velocity of contaminant uptake by the medium. In other words, the liquid flow rate may not be so rapid that the selected contaminant is not effectively removed from the system upon completion of a traversal of the length of the tube. In addition, very rapid liquid flow rates can cause a backwashing of medium down the tube (i.e., a movement of medium in reverse direction to its advance by rotation of the helical coil). On the other hand, very slow flow rates may also be disadvantageous, in that for many media optimum treatment conditions involve formation of a liquid/medium slurry; if the liquid flow rate is too slow, drying may occur, whereby optimum contact of the medium with the liquid is not achieved. A further requirement is that liquid flow rate must exceed the reverse flow of liquid inevitably carried up along with the medium by rotation of the tube. Thus, in a system without any liquid feedback means wherein each turn of the helical coil has a volume of X ml and the tube is rotated one turn per minute, the influent flow rate must be in excess of X ml/min to ensure a net positive liquid flow from the proximal to the distal end of the tube.

In operation, each rotation of the tube causes ejection of both the medium and the liquid contained in the volume defined by an uppermost turn of the helical coil. As a consequence, to achieve a net downward flow of the liquid, it has been found expedient to return this liquid immediately after it exits by means of a feedback pump to the upper part of the tube. In practice, filter means are advantageously employed to exclude the medium from this recirculation; the separated medium, having at this stage traversed the length of the tube, is suitably passed on to further treatment for the optional recovery of the contaminant(s) loaded thereon, as well as for regeneration so as to make it suitable for reuse in treatment of additional contaminated liquid. Of course, practical operation of the system requires that the feedback pump rate match or exceed the rate of influent introduction into the system.

Further according to the present invention, a liquid/medium contact means similar in design and construction to the screw tube may also be used to unload or "dump" contaminant associated with the medium during the treatment process. In a particularly advantageous arrangement, the release of contaminant from the medium is achieved using a combination of operating parameters whereby a very small volume of liquid is needed to dump the contaminant loaded onto the medium, so as to form a highly concentrated solution of the contaminant. This has particular advantage with respect to subsequent recovery or disposal of the contaminant; in the case of metals, for example, such highly concentrated solutions are particularly suitable for treatment by electrowinning, precipitation, etc.

A continuous, essentially self-contained treatment system according to the present invention is provided through the use of a pair of coupled treatment systems in accordance with the invention, for example the above-described screw tubes, whereby a first tube is employed for removal of a given contaminant from a liquid and the second tube is used for regeneration of the affinity medium. By continuously recycling medium regenerated in the second tube back into the first tube for treatment of further influent, while continuously transferring medium exiting the proximal end of the first tube to the second tube for regeneration, it is in theory possible to form a closed loop for contaminant removal from essentially unlimited volumes of liquid, using a given fixed amount of contaminant affinity medium. In practice, however, there is a certain amount of attrition of the medium resulting from mechanical contact and friction phenomena; in most systems and with most media, attrition would be minimal. Moreover, even when theory predicts a complete regeneration of medium, there may in certain instances be less than a 100% availability of loading sites over time for any given combination of contaminant/regenerant. Nonetheless, significant process advantages may be achieved in many situations through the use of a coupled contaminant removal/regeneration scheme comprising two tandem treatment systems each in accordance with the invention.

In practice, when for example two such systems each in the form of a screw tube are coupled, the medium input rate in the regeneration unit should be essentially equivalent to that in the contaminant removal process. Thus, the rate of medium movement in the regeneration ("dumping") unit is essentially fixed by the rate employed in the contaminant removal ("loading") unit. In this manner, a constant flow of regenerated medium from the dumping unit to the loading unit, and a similar flow of contaminant-loaded medium to the dumping unit, is readily achieved.

In order to attain a maximum concentration of the contaminant upon dumping, it is generally desirable to move the largest possible volume of medium up the tube with the least possible downward flow of dumping reagent solution, so as to employ the smallest possible volume of liquid. When, for example, metals are removed from an ion exchange medium, it is often possible to concentrate the metals up to at least 1.0 M under optimal operating parameters. When dumping a contaminant, such as a metal, it is essential that the flow of dumping reagent solution down the tube must exceed its backward motion by tube rotation; otherwise, the peak of dumped contaminant concentration, which should be found at the distal end of the tube, may otherwise move up the tube to the proximal end or to some intermediate point. In most cases, the concentration of the dumping reagent solution will be highest at the proximal end and lowest at the distal end. Any available sites on incoming medium to be dumped will take up portions of already-dumped contaminant from the liquid phase about to exit the system; this results in an effective lowering of effluent contaminant level. As the available sites on any given medium is fixed, the higher the residual dumping reagent concentration is at this stage, the lower the proportion of dumped contaminant that will be taken up by the medium. Therefore, use of a highly concentrated dumping reagent is also particularly advantageous with respect to concentration of the effluent.

In the case of metals recovery using an ion exchange medium, the concentration of the dumping reagent is reflected in the concentration of the metal removed. For example, 1 liter of medium having a capacity of 65 g Cu/L saturated with $Cu^{2+}$ may in theory be displaced by 1 L of a 2M $Na^+$ dumping solution. The resultant effluent solution has a $Cu^{2+}$ concentration of 65,000 parts per million. In practice, it has been found that about 3M $Na^+$ dumping solution is actually required for the case where there is an equal volume of medium and dumping solution. It is of course possible to employ larger volumes of a more dilute dumping solution; however, the concentration of the contaminant in the resultant effluent will necessarily also be lower, thereby making ultimate recovery or disposal thereof more difficult.

Figures 1, 2:
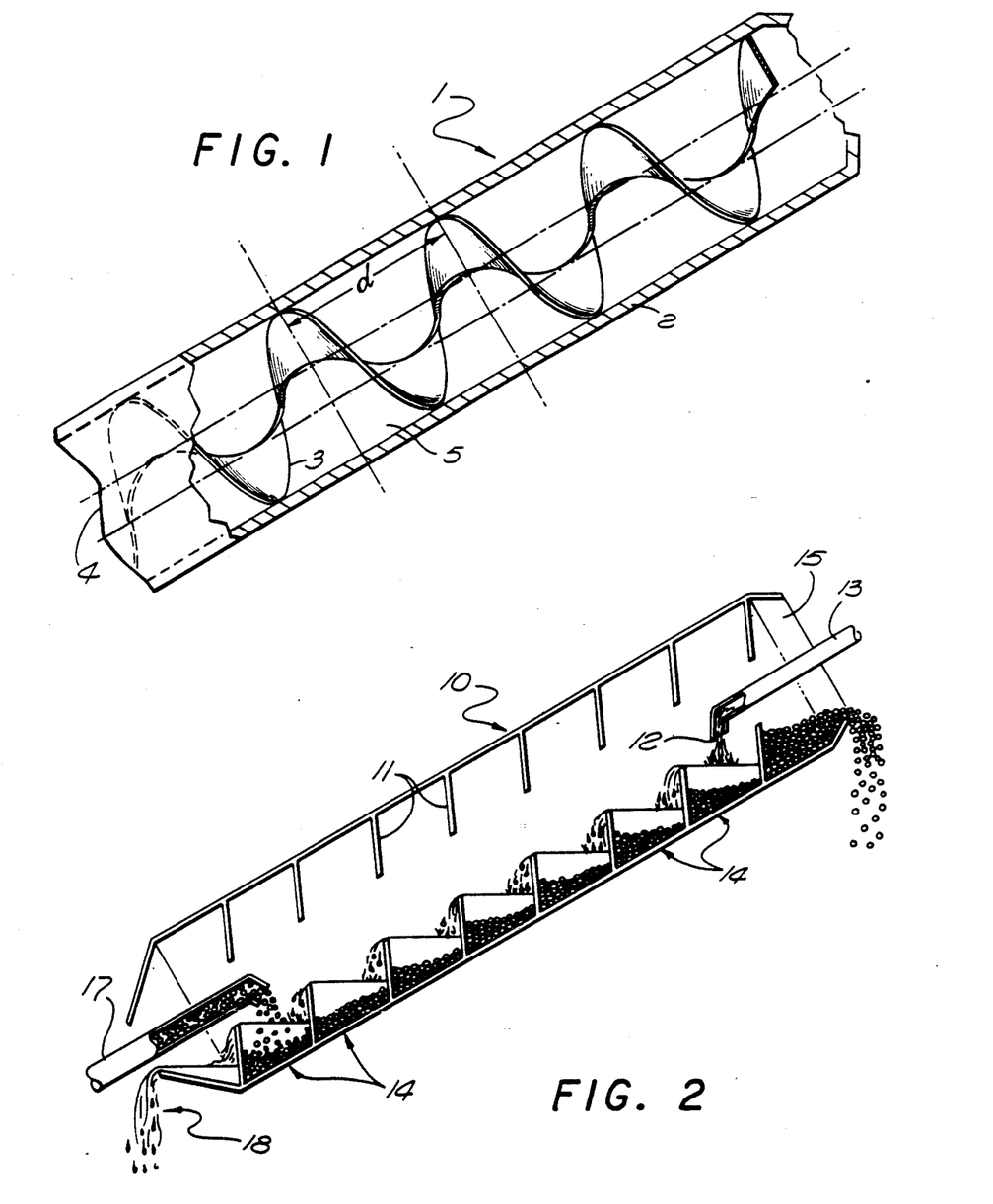
FIG. 1 illustrates a section of a helicoidal screw tube as employed in accordance with one embodiment of the invention.
FIG. 2 illustrates in schematic form the countercurrent movement of medium to liquid during the use of a helicoidal screw tube in accordance with one embodiment of the invention.

In accordance with the preferred embodiment of the invention discussed previously, the countercurrent movement of medium relative to liquid is efficiently carried out using a helicoidal screw tube, a section of one form of which is depicted in FIG. 1. The screw tube 1 in its most generalized form comprises an outer casing 2 and a helical coil 3. In the embodiment illustrated in FIG. 1, the helical coil 3 has a concentric opening 4 on its inner circumference to permit free passage of fluid therethrough; it is, however, possible to use a helical coil which is not provided with such concentric opening. The helical coil 3 is ideally designed to be watertight along its outer circumference, where it is joined to the inside surface of the casing 2.

It will be readily apparent that the helicoidal screw tube of FIG. 1 comprises in effect a series of chambers 5, defined as the volume contained in the space between consecutive turns in the helical coil 3 over the linear advance of one pitch distance d. As is well known in the art, many variations in screw design are possible. Among the most common are the following: single flight—standard pitch, wherein the pitch equals the diameter; single flight—short pitch, wherein the pitch is less than the diameter; double flight—standard pitch, wherein the distance between flights equals one-half the diameter; and double flight—short pitch, wherein the distance between flights equals one-third the diameter. While the embodiment illustrated in FIG. 1 comprises a single helical coil 3, moreover, it is also possible to employ two or more concentric coils so as to modify the flow of the medium and/or liquid through the tube.

The countercurrent movement of medium relative to liquid is illustrated in schematic form in FIG. 2, where the helical coil has been removed for purposes of simplification. In this illustration, the screw tube 10 is depicted as comprising a series of consecutive barriers 11, corresponding roughly to the surfaces of each turn of the helical coil 3 (as illustrated in FIG. 1). Liquid 12 containing one or more contaminants to be removed therefrom is introduced via liquid introduction means 13 into a first of a series of consecutive chambers 14 (roughly as formed by the consecutive surfaces of the helical coil) at the proximal end 15 of screw tube 10. Medium 16, in turn, is introduced via medium introduction means 16 into the last of the series of consecutive chambers at the proximal end !8 of screw tube 10. With each turn of the screw tube 10, liquid 12 progresses in sequence through each chamber 14, traversing the tube from proximal end 15 to distal end 18. Medium 16, on the other hand, is moved in a countercurrent direction through the consecutive chambers 14, i.e., from distal end 18 to proximal end 15. Of course, the arrangement illustrated in FIG. 2 is an oversimplification of an actual helicoidal screw tube apparatus, in that discrete "chambers" are not formed therein; rather, an essentially continuous path for movement of liquid and medium is provided by the continuous surfaces of the helical coil. Nonetheless, in principle each individual particle of medium and molecule of liquid traversing the system (in relative countercurrent movement of medium to liquid) may be viewed as experiencing a sequence of microenvironments analogous to the discrete chambers illustrated in FIG. 2.

Figure 3:
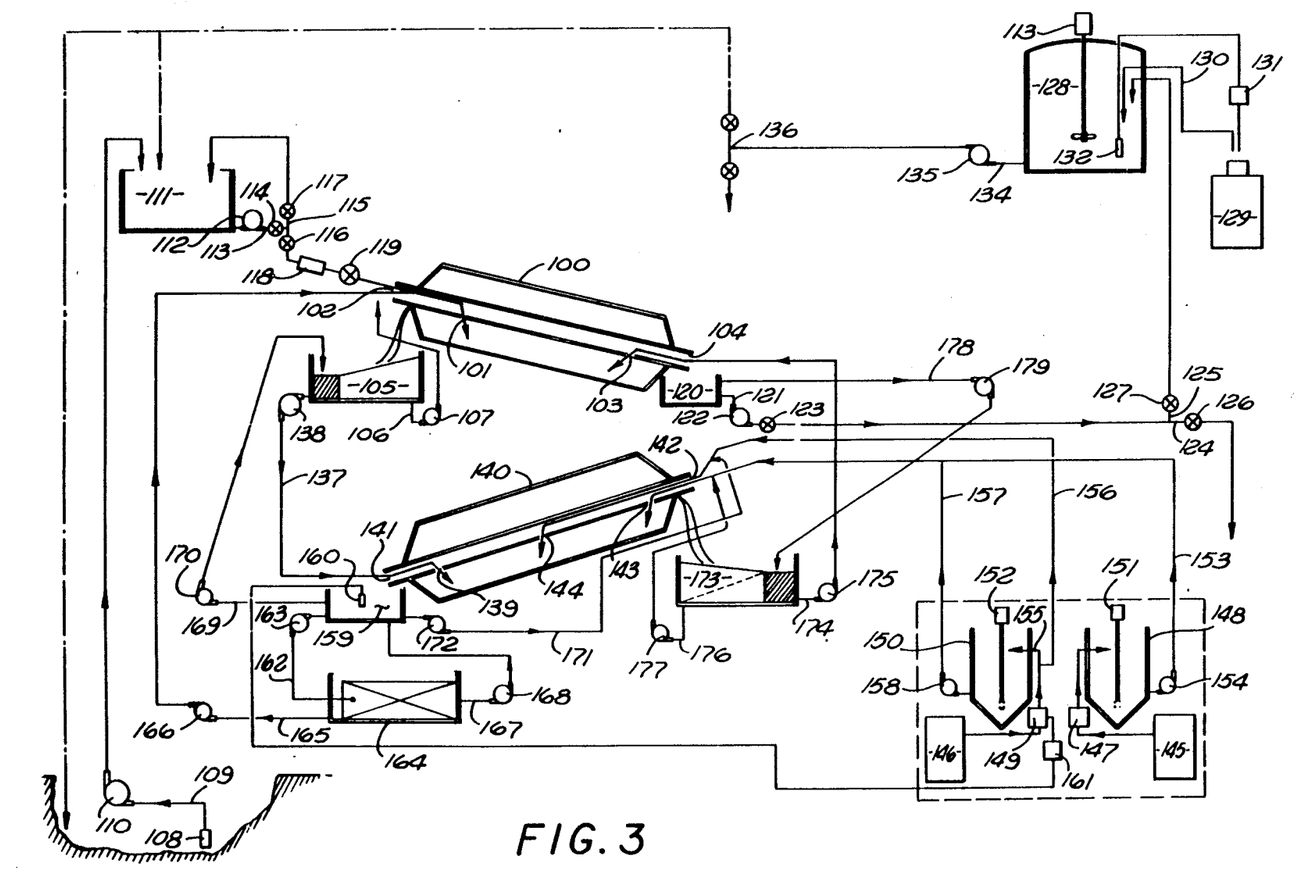
FIG. 3 illustrates in schematic form a multiple screw tube system for continuous removal of contaminant and regeneration of medium.

In a particularly preferred embodiment presently contemplated as the best manner in which to carry out the invention, a pair of helical screw tubes are employed: a first helical screw tube is used to remove contaminants (for example, metals) from a liquid, while a second screw tube is used to regenerate medium for reuse in the first tube. Such an arrangement of two helical screw tubes is illustrated in FIG. 3, in connection with the removal of metals from an acidic medium. The illustrated operations system includes many specific elements useful in an optimized process for removal of metals from an acidic medium, and thus many features described in relation thereto may be replaced by analogous means for carrying out the same or a similar function; further, many of the elements included in this preferred embodiment may be eliminated entirely even in the treatment of such acidic solutions, and would be unnecessary where, for example, treatment of neutral liquids is contemplated or where neutralization of the solution from which one or more contaminants are being removed is not desired.

Referring to FIG. 3, a first helical screw tube 100 for removal of contaminant(s) from a liquid (in this instance, removal of metals from an aqueous acidic solution) comprises an inlet 101 for introduction of the liquid to be treated near the proximal end 102 and an inlet 103 for introduction of medium near the distal end 104. Medium which has traversed the length of tube 100 (and is thus loaded with whatever contaminants the system is designed to remove) exits at the proximal end 102 into a medium separation tank 105, where the solid medium is physically separated from any liquid entrained therein. As the liquid associated with the medium is essentially untreated at this stage, it is reintroduced into tube 100 via line 106 by means of pump 107.

Raw liquid to be treated (optionally, after passage through a strainer 108) is transferred via line 109 assisted by pump 110 into a surge tank 111. Pump 112 transfers liquid from surge tank 111 into line 113 provided with a cut-off valve 114. When valve 114 is open, liquid flows through a T-connection into line 115 equipped on either side of the T-connection with cut-off valves 116 and 117. When valve 116 is open and valve 117 is closed, liquid flow continues through line 115 to a flow indicator 118 and a further cut-off valve 119 upstream of flow indicator 118; when valve 119 is open, liquid is introduced into the tube 100 via inlet 101 for treatment. When valve 116 is closed, liquid flow is diverted through valve 117 back into surge tank 111. The valves are controlled manually or by programmed microprocessor.

Treated liquid which has traversed the length of tube 100 exits the system at the distal end 104 into a holding tank 120. At least a portion of the treated liquid may be removed from holding tank 120 via line 121 (provided in the illustrated embodiment with a pump 122 and cut-off valve 123).

As the apparatus of FIG. 3 is designed for treatment of acidic solutions, flow is diverted from line 121 by means of a T-connection into lines 124 and 125 provided with cut-off valves 126 and 127, respectively. If neutralization of the treated liquid is not necessary, valve 127 is closed, whereby liquid flows through line 124 and open valve 126 to the desired final point of removal from the system (not shown). If neutralization is required, valve 126 is closed; flow continues through open valve 127 via line 125 into neutralization tank 128. Concentrated base (suitably, NaOH) is introduced into the neutralization tank 128 from a tank 129 via line 130. The pH in neutralization tank 128 is monitored with a pH controller 131 and a pH probe 132; a variety of different pH controllers may be employed, including for example the models manufactured by Geroge Fischer - Signet Inc., Tustin, Calif. Neutralization tank 128 is preferably provided with mixing means 133 (of conventional design).

When neutralization has been completed, the treated liquid exits the neutralization tank 128 via line 134 (in the illustrated embodiment, equipped with pump 135). At this point, the liquid in line 134 may either be removed from the system or, if necessary, recycled to the surge tank 111 (or even its point of origin) for further treatment; in the illustrated embodiment, this is effected by means of a T-connection 136 to lines for removal of liquid from the system and for its recycle (each provided with cut-off valves).

Regeneration of spent medium in the preferred embodiment of FIG. 3 is effected as follows. Loaded medium (which has been removed from tube 100 at the proximal end 102 thereof) after separation from entrained liquid in medium separation tank 105 is introduced via line 137 (assisted in the illustrated embodiment by pump 138) and medium inlet 139 into the medium regeneration tube 140 near the distal end 141 thereof. In the illustrated embodiment, medium regeneration treatment fluid is introduced from the proximal end 142 of tube 140 at an inlet 143 near the proximal end 142 and an inlet 144 located approximately centrally in tube 140; other locations and fluid introduction arrangements may also be suitable, depending on the nature of the medium and the regeneration treatment which is contemplated.

For removal of metals from loaded medium according to the preferred embodiment illustrated in FIG. 3, the following arrangement for provision of the medium regeneration treatment fluid is particularly suitable. A saturated solution of $Na_2SO_4$ (prepared for example by maintaining an excess of the salt in powder form in an aqueous solution) is provided in a tank 145. Concentrated $H_2SO_4$ is similarly provided in a tank 146. The concentrated salt solution is introduced via chemical feeder means 147 (for example, a Liquid Metronics (LMI) piston pump operated by a pH controller, distributed by LMI, Acton, Massachusetts) into a mixing tank 148; similarly, the concentrated acid solution is introduced via chemical feeder means 149 into a mixing tank 150. Tanks 148 and 150 are suitably provided with mixer means 151 and 152, respectively. Salt solution is prepared at a suitable dilution (for example, by using a Liquid Metronics (LMI) metering pump for water and reagent solution) and is transferred from mixing tank 148 via line 153 (assisted in the illustrated embodiment by pump 154) for introduction into tube 140; in the particular system of FIG. 3, the salt solution is fed into the tube 140 at inlet 143 near proximal end 142. One portion of the concentrated acid solution is introduced from tank 146 into tank 150 via line 155 by chemical feeder means 149; another portion is fed directly into tube 140 (in the embodiment illustrated, at inlet 144) via line 156. In tank 150, the acid solution is diluted to a suitable concentration (e.g., 8 N) and then transferred via line 157 and pump 158 to a junction with line 153 (transporting the dilute salt solution); of course, the dilute acid solution could also be introduced directly into tube 140 (for example, at the same inlet 143 where the salt solution is introduced) by separate conduit means.

After its use in treatment of loaded medium in tube 140, the combined medium regeneration fluids (i.e., the combined acid and salt solutions) exit tube 140 at distal end 141 into a holding tank 159. The pH of the liquid in holding tank 159 is monitored by means of a pH probe 160 in association with a pH controller 161, which serves in particular to control operation of chemical feeder means 149 in response to variations in pH of the liquid in holding tank 159.

A portion of the liquid in holding tank 159 is fed by means of line 162 and pump 163 into contaminant recovery means 164 (for example, an electrowinning cell for recovery of metals). In the illustrated embodiment, the contaminant recovery means 164 is designed to bleed overflow from the electrowinning cell via line 165 and pump 166 back into the contaminant removal tube 100 by a connection upstream of valve 119 with line 115. After recovery of contaminant, liquid from contaminant recovery means 164 is reintroduced in this embodiment into holding tank 159 via line 167 and pump 168. Another portion of the liquid in holding tank 159 is suitably introduced via line 169 and pump 170 into medium separation tank 105. This liquid is used to slurry the dewatered, loaded medium. The medium then exits tube 100 at proximal end 102 thereof. After separation of any liquid entrained in the medium when it is removed from tube 100 in medium separation tank 105, the medium is slurried with liquid from line 169 and the medium and liquid are pumped by pump means 138 via line 137 to medium inlet 139 of tube 140.

A final portion of the liquid in holding tank 159 may be bled via line 171 and pump 172 back into tube 140 for reuse in medium regeneration. Suitably (as in the illustrated embodiment), line 171 forms a connection with line 156 (used for introduction of the concentrated acid solution), whereby the combined solutions are introduced into tube 140 at inlet 143 so as to minimize the amount of water employed and thus achieve higher concentrations.

After completion of its traversal through tube 140, the medium is at least substantially regenerated. Upon exit of the regenerated medium from tube 140 at proximal end 142 thereof, the medium is introduced into a medium separation tank 173. The regenerated medium is recycled to tube 100 via line 174 and pump 175 for use in removal of further contaminants from the raw liquid being treated. Any liquid entrained in the medium and separated therefrom in the medium separation tank 173 is returned via line 176 and pump 177 for use in medium regeneration (in the illustrated embodiment, via a connection of line 176 with line 153 for introduction of dilute acid/salt solution). Advantageously (as in the apparatus of FIG. 3), the medium in medium separation tank 173 is also slurried with a portion of the solution in holding tank 120 which has already been treated by passage through tube 100; this solution is introduced into medium separation tank 173 via line 178 and pump 179.

While the use of a screw tube arrangement has been described in considerable detail, it will of course be understood that the present invention contemplates the use of any practical means for achieving a flow of solid medium countercurrent to the direction of liquid flow. For example, a system whereby counterflow of medium relative to liquid is achieved by exploitation of differences in specific gravity between the solid and liquid could obviate the need for mechanical means to physically transport medium through the system; in such an arrangement, media movement means would serve primarily the purposes of introducing the solid medium into the system initially and ensuring appropriate mixing and separation rates within the system. Other possible arrangements for achieving medium movement countercurrent to the direction of liquid flow are also well within the scope of the present invention. The invention may be better understood by a consideration of the following detailed examples. It is to be noted, however, that the examples are included for illustrative purposes only and should not be construed as in any sense limiting the present invention as defined in the appended claims.

EXAMPLE 1

This example describes the removal of copper from a solution containing 2000 ppm thereof. This treatment of what in theory would constitute the most simple system wherein the present invention may be employed (i.e., removal of a single contaminant from a solution containing no competing contaminants) was explored in order to determine the maximum practical flow rate through a laboratory screw tube as employed in all of Examples 1–5. This tube was 4" in diameter, with a total of 24 turns of the internal helical coil over a length of 48 inches. In operation, the tube was subjected to 2 seconds of 180° shaking (i.e., the tube is alternately rotated 180° clockwise, then 180° counterclockwise, for a total time of 2 seconds). $CuSO_4$ MacDermid plating solution (pH 2.82) diluted with water to a copper concentration of 1962 ppm was employed. The medium was Purolite C-100-$H^+$. The solution feed rate into the proximal end of the tube was varied over the range of 160–528 ml/min. The copper concentration of the effluent (in ppm) was measured periodically at the distal end of screw tube by Thermo-Jarrell-Ash Model Plasma 300 ICP. The screw tube was rotated at a rate of 1.2 rpm, with mixing and recirculation of ejected liquid at the proximal end. The tube was maintained at an angle of 5°. The rate of medium feed ranged between 30 ml/min and 53 ml/min. Upon completion of treatment, it was determined that the copper load on the C-100 medium was 69% of saturation (due to the acidic nature of the input, $H^+$ accounted for 31% of the theoretically available sites for loading of copper). The pH of the effluent was about 1.80.

The results of the treatment in the screw tube over the range of influent flow rates are reported in Table 1. In principle, a maximum acceptable level of copper in the effluent is about 1 ppm. Therefore, an acceptable degree of copper removal from the solution was achieved over the entire range of solution influent rates tested.

TABLE 1

Effect of Flow Rate Variations on Effluent Copper Level

| Input (ml/min.) | Cu Effluent Conc. (ppm) |
|---|---|
| 160 | 0.61 |
| 190 | 0.33 |
| 290 | 0.23 |
| 352 | 0.65 |
| 388 | 0.54 |
| 427 | 0.97 |
| 525 | 0.57 |

EXAMPLE 2

This example describes the uptake of $Cu^{++}$ from MacDermid plating solution by means of a screw tube counterflow system as described in Example 1. In contrast to the relatively dilute solution treated in the previous example, the influent here comprised a 41,700 ppm solution of $Cu^{++}$. The tube angle was 6°; the tube was rotated at 1.5 rpm with constant reciprocal agitation. The solution was introduced at the proximal end of the tube at a feed rate of 111 ml/min. Purolite C-100 medium was introduced at the distal end of the tube at a rate of 69 ml/min. At steady state, the effluent concentration of $Cu^{++}$ was in the range of 0.34–0.72 ppm. Thus, the inventive system has been shown to accommodate even highly concentrated solutions in a single treatment regimen.

EXAMPLE 3

This example describes the selective removal of $Fe^{+3}$ from an $Fe^{+3}/Zn^{+2}$ solution. To simulate the first step in the processing of Electric Arc Furnace Dust (EAD) extract to recover purified zinc metal, an aqueous solution was prepared of $Fe_2(SO_4)_3$ and $ZnCl_2$ (MacDermid plating solution) in the following concentrations: $Fe^{+3}=5000$ ppm; $Zn^{+2}=10,000$ ppm (pH = 1.99). The medium employed for separation of the iron from the mixture with zinc was a 1:1 mixture by volume of IRC 718 $H^+$ and IRC 718 $Na^+$ (Rohm and Haas). Feed rate for the medium was 21 ml/min. The screw tube was rotated at 0.5 rpm with reciprocal 180° shaking every 2 seconds; the angle of the tube was 5° from the horizontal. Input of the $Fe^{+3}/Zn^{+2}$ solution was 84 ml/min. Upon completion of the treatment, it was determined that the medium was approximately 90% saturated with $Fe^{+3}$ and about 8% protons. The pH of the effluent after steady state conditions had been achieved was 2.88.

This example demonstrates that $Fe^{+3}$ (as is present in EAD extract) is readily separated from $Zn^{+2}$ pursuant to the inventive method. The purity of $Zn^{+2}$ in the effluent recovered at the distal end of the screw tube was 99.9%. Moreover, $Fe^{+3}$ as recovered the loaded medium collected at the proximal end of the screw tube was 98% pure.

TABLE 2

| Effluent Fe Time (min.) | Effluent Concentration % Fe Conc. (ppm) | Effluent Zn Conc. (ppm) | Effluent Zn on medium |
|---|---|---|---|
| 12 | 1.56 | 0.53 | — |
| 72 | 266 | 154 | 66 |
| 132 | 6,556 | 44 | 84 |
| 145 | 10,956 | 49 | 98 |
| 300 | 11,695 | 15 | 96 |

EXAMPLE 4

This example demonstrates separation of $Zn^{+2}$ from $Al^{+3}$, $Mn^{+2}$, and $Na^+$ in a simulated EAD extract from which iron had been removed. To the zinc effluent of Experiment II, additional metals were added so that the following concentrations (in ppm) were achieved: Zn=10,450; Al=156; Mg=1,510; Mn=1,190; and Na =8,940. The medium was again a 1:1 mixture of IRC 718 $Na^+$ and IRC 718 $H^+$. The screw tube operating parameters were the same as in the preceding example. Medium feed rate was 30 ml/min; solution feed rate was 66 ml/min. The pH of the effluent was 2.91. Recovery of metals loaded onto the medium was effected by regeneration in 4N $H_2SO_4$ for 15 minutes, with one repetition.

The metals content of the effluent at the distal end of the tube and the composition of the metals unloaded from medium recovered at the proximal end of the tube are reported in Tables 4A and 4B, respectively.

TABLE 4A

| Time (min.) | Effluent Concentration (ppm) | | | | |
|---|---|---|---|---|---|
| | Zn | Al | Mg | Mn | Na |
| 12 | 0.03 | −0.03 | 0.08 | 0.00 | 4,718 |
| 60 | 4 | <0.2 | 63 | <0.01 | 9,591 |
| 147 | 38 | <0.2 | 6,038 | 294 | 3,040 |
| 207 | 34 | <0.2 | 1,369 | 620 | 10,261 |
| 272 | 4 | <0.2 | 560 | 311 | 8,642 |

TABLE 4B

| Time (min.) | Metals Concentrations Off Medium Out Proximal End | | | | | |
|---|---|---|---|---|---|---|
| | Metal Concentration (ppm) | | | | | |
| | Zn | Al | Mg | Mn | Na | % Zn |
| 120 | 4,186 | 81 | 5 | 68 | <10 | 99.8 |
| 200 | 4,632 | 112 | 5 | 38 | 11 | 97.6 |
| 260 | 4,047 | 95 | 13 | 28 | 15 | 98.4 |

EXAMPLE 5

This example describes extraction of metals from a "pickle liquor," an acidic solution routinely used in the treatment of processed steel materials at a steel plant to remove surface contaminants (primarily metal oxides) prior to fabrication or metal coating of finished products. While a principal objective of this treatment is regeneration of the spent highly acidic solution for re-use in the treatment plant, fiscal considerations suggest that a most attractive mode of operations which also include recovery of the substantial zinc content of such solutions. In this example, the first part of this procedure (regeneration of the solution) is illustrated; subsequent examples describe aspects of selective metals recovery which can be exploited in combination to provide substantially pure zinc.

The screw tube system of Example 1 was employed, at an angle of 6° and a 0.5 rpm rate of rotation. Spent pickle liquor from a steel plant (pH on the order of 0.1–0.2) was introduced at the proximal end of the tube at a feed rate of 58 ml/min. Purolite C-100 (H+) medium was introduced at the distal end at a rate of 32 ml/min. The effluent pH after steady state conditions had been achieved was on the order of 0.25.

Table 5 reports the concentration of three metals in the influent and the effluent after steady-state conditions had been reached. As the results indicate, the inventive system permits an extremely efficient recovery of metals from the highly-acidic pickle liquor, which had been found generally quite difficult to treat using conventional methods.

TABLE 5

| Metal | Metals Concentration (ppm) | |
|---|---|---|
| | Influent | Effluent |
| Fe | 16,021 | 0.54 |
| Pb | 150 | <0.01 |
| Zn | 8,332 | 2.29 |

EXAMPLE 6

This example describes the removal of $Cu^{+2}$ from IRC 718 medium in a portion of a screw tube and the subsequent loading of $Fe^{+3}$ onto the medium before it exits the screw tube. Using this technique, it is possible to replace a metal having a high affinity for IRC 718 with one having lower affinity therefor in a single pass through the screw tube. Input medium comprised Cu-loaded IRC-718 which entered the distal end of tube. The dumping solution was 1.0 N $H_2SO_4^{-2}$ 1.0 M $Na_2SO_4$ (introduced at a rate of 35 ml/min) fed directly into the screw tube at a half-way point (i.e., chamber 12) by means of a glass tube. In this manner, Cu is removed from the medium upon contact with the dumping solution in chambers 12 to 24. Input to the proximal end of tube at a flow rate of 20 ml/min comprised a solution of $Fe_2(SCO_4)_3$ at 15,000 ppm (pH 1.88), whereby the medium was loaded with $Fe^{+3}$ in chambers 1 to 12; the rate of medium feed was 22 ml/min. The screw tube operating parameters were otherwise as in Example 2.

The effluent metals concentrations over time as a result of treatment as described in this example are reported in Table 6. The concentration of iron recovered from the medium ejected from the proximal end of the screw tube after 120 minutes was about 2145 ppm, whereas copper was present only at about 43 ppm; this would correspond to a medium metals load of about 98% iron.

TABLE 6

| Time (min.) | Analysis of Effluent | | |
|---|---|---|---|
| | Metals Concentration Distal end (ppm) | | % Cu |
| | Cu | Fe | Output |
| 30 | 1,183 | 44 | 96.5 |
| 50 | 1,284 | 4 | 99.7 |
| 120 | 3,940 | 23 | 99.4 |
| 180 | 5,740 | 81 | 98.6 |

EXAMPLE 7

This example illustrates the selective separation of $Fe^{+3}$ from a mixed metals solution. The solution (with a pH of about 1.8) had the following concentrations of metals in ppm: Zn=9,490; Fe=6,480; Mn=1,210; Mg=1,510; Al=165; Cu=40; and Ni=8.5. The rate of solution input at the proximal end was 55 ml/min; the rate of medium input at the distal end was 25 ml/min. The medium was IRC 718 (50% H+, 50% Na+).

The metals concentrations in the effluent over time are reported in Table 7. Whereas the results might suggest that at least a significant portion of the zinc in the original mixed metals solution had been removed from the effluent and thus would be recovered upon unloading of the medium, it was subsequently determined that the medium (as removed from the proximal end of the tube) was essentially fully loaded with iron and contained only a minor amount of zinc. It turns out that there is formation of a zinc "loop" in the system, whereby a significant portion of the zinc is loaded onto the medium at or near the distal end of the tube but is subsequently displaced by higher-affinity metals (e.g., iron and copper) as the medium progresses through the system towards its point of exit at the proximal end of the tube. This sequence of zinc loading and unloading may continue indefinitely, as long as the concentration of higher-affinity materials in the influent is sufficiently high to displace any zinc loaded onto the medium prior to its removal at the proximal end of the screw tube, but not so great as to compete successfully with zinc for available sites on the medium at the distal end of the tube (as occurs, for example, when a metal is dumped from the medium). In fact, it has been determined that in many systems, a plurality of such loops may be formed, depending upon the relative rates of medium movement, influent flow rate and tube rotation. As the amount of metal in a loop increases, the end of the loop will progressively approach, and ultimately exit, the distal end of the tube, pushing all lower affinity metal loops towards and out of the distal end. Eventually, the highest affinity metal will also exit the tube. It is indeed possible to exploit such loops so as to achieve selective removal and/or recovery of a given material, simply by removing medium from the system at a location corresponding to the point of maximum loading of that material onto the medium. In this manner, a single treatment regimen may be employed to recover a plurality of components from a mixture of contaminants, through the use of a treatment device which permits removal of medium from the system at a plurality of locations.

TABLE 7

| Time (min.) | Effluent Analysis Metals Concentration (ppm) | | | | | | |
|---|---|---|---|---|---|---|---|
| | Fe | Zn | Mn | Mg | Al | Cu | Ni |
| 52 | 67 | 1,997 | 826 | 930 | 111 | <1 | <4 |
| 105 | 45 | 3,088 | 724 | 840 | 93 | <1 | 6 |
| 135 | 95 | 4,080 | 939 | 1,120 | 119 | <1 | 7 |
| 195 | 70 | 3,010 | 772 | 970 | 78 | <1 | 2 |

EXAMPLE 8

This example describes the removal of iron and chrome from boiler tube cleaning solution containing formic and hydroxyacetic acids. Using a tube as described in Example 1, treatment was carried out with the tube at a 6° angle of inclination and a rotation rate of 1 rpm (48 shakes between 1 revolution at a rate of 30 rpm). The medium was Purolite C-100-H+. Medium was introduced at a feed rate of 45 ml/min. Boiler cleaning solution (pH 3.35) was introduced at a rate of 100 ml/min. The metals concentration of the solution was 4550 ppm Fe and 1.53 ppm Cr. After a treatment of approximately 3 hours, 15 minutes duration (during which a total volume of 8775 ml was treated), the effluent liquid contained no detectable chrome and between about 0.53–0.73 ppm iron (average =0.64 ppm).

EXAMPLE 9

This example describes removal of metals from an HCl boiler tube cleaning solution. Using the screw tube of Example 1 at a 6° angle of inclination and an rpm of 2.0 (24 shakes between revolutions, 30 rpm rate per revolution), boiler cleaning solution (pH 1.35) was introduced into the proximal end of the tube at 52 ml/min. The medium was 4 parts Purolite C-100-H+, 1 part Purolite A-100-SO$_4$= introduced at the distal end of the tube at a rate of 30 ml/min. The metals concentrations in the input feed were as follows (in ppm): Zn, 169; Fe, 9726; Mn, 57; Mg, 80; Al, 9: Cu, 15; Ni, 490; Cr, 13; Ca, 91; and Pb, 24. After treatment of approximately 5 hours in duration, the high and low effluent concentrations were determined as follows (in ppm):

| | Zn | Fe | Mn | Mg | Al | Cu | Ni | Cr | Ca | Pb |
|---|---|---|---|---|---|---|---|---|---|---|
| H | 0.93 | 0.86 | 0.06 | 4.1 | 2.74 | 0.05 | 0.28 | 0.98 | 7.20 | 0.24 |
| L | 0.04 | 0.32 | 0.02 | 0.5 | 0.01 | 0.01 | 0.04 | 0.47 | 3.19 | 0.56 |

EXAMPLE 10

This example describes removal of copper from ammoniacal boiler tube cleaning solution. Using the tube, angle of inclination and shaking regimen of Example 1 and an rpm of 1.0, boiler solution (pH 10.5) was introduced into the proximal end of the tube at a rate of 196 ml/min. The medium was IRC-718-Na+, introduced at the distal end at a feed rate of 30 ml/min. The copper concentration of the input solution was 1120 ppm. After a treatment of approximately 2.5 hours, the effluent concentration of copper was about 0.32–0.80 ppm.

EXAMPLE 11

This example describes displacement of copper from Purolite C-100-Cu. Using the tube, angle of inclination and rotation regimen of Example 1 and a 0.5 rpm, deionized water was introduced at the proximal end of the tube at a rate of 28 ml/min whereas 1.0M Na$_2$SO$_4$–2N H$_2$SO$_4$ was introduced at approximately the midpoint of the tube at a rate of about 27 ml/min. Furthermore, deionized water was used to wash the medium before it exited at the proximal end. When steady state conditions had been achieved, the copper concentration of the effluent was approximately 20,778 ppm, indicating a successful preparation of concentrated copper solution.

EXAMPLE 12

This example describes selective removal of Fe from Electric Arc Furnace Dust (EAD) extract prepared by HCl extraction of the dust. The HCl extract had the following metals concentrations (in ppm): Zn, 6671; Fe, 6345; Mg, 9.2; Mn, 1003; Al, 110; Cu, 22: and Ni, 4. Using the tube, angle of inclination and shaking regimen of Example 1 and a 0.5 rpm, the EAD extract (pH 0.83) was introduced at the proximal end of the tube at a feed rate of 69 ml/min. The medium was IRC 718 (50% Na+–50% H+, introduced at the distal end at a rate of 25 ml/min. Upon achievement of steady state conditions (over an approximately 3 hour run duration), the effluent metals concentrations were as follows (in ppm): Zn, 6361; Fe, 256; Mg, 7.6; Mn, 1071; Al, 238; Cu, 0.01; and Ni, 13. The apparent increase in concentration of Al and Ni in the effluent reflects the formation of a loop involving these two metals, whereby the steady-state effluent becomes more concentrated relative to the influent solution. The purity of the Fe on the IRC-718 medium (i.e., the Fe removed from the EAD extract) was greater than 90%.

EXAMPLE 13

This example describes selective removal of zinc from an EAD extract from which Fe had previously been removed. Using the tube, angle of inclination and shaking regimen of Example 1 and a 0.5 rpm, the EAD extract less Fe (pH 1.63) was introduced at the proximal end of the tube at a rate of about 26 ml/min. The medium was IRC-718 (50% Na+–50% H+) introduced at the distal end at a rate of 26 ml/min. The influent (I) and effluent (E) metals concentrations, the latter after a treatment of approximately 3 hours duration, were as follows (in ppm):

| | Zn | Fe | Mn | Mg | Al | Cu | Ni |
|---|---|---|---|---|---|---|---|
| I | 10,152 | 187 | 1297 | 1280 | 195 | <0.01 | 12 |

| | Zn | Fe | Mn | Mg | Al | Cu | Ni |
|---|---|---|---|---|---|---|---|
| E | 587 | 31 | 675 | 720 | 3 | <0.01 | <0.01 |

Approximately 94% of the Zn had been removed from the solution after completion of the treatment. The lower concentrations of other metals in the effluent solution reflect the formation of loops in the treatment tube. Eventually, the other metals would exit the tube, as evidenced by the fact that the medium ejected from the tube had taken up virtually only Zn (the purity of the Zn on the medium was determined to be approximately 99.6%).

EXAMPLE 14

This example describes displacement of Fe from IRC-718 Fe medium as obtained after selective removal of Fe from EAD extract (Example 12). Using the tube, angle of rotation and shaking regimen of Example 1 and a 1.0 rpm, 4.0N HCl was fed into the proximal end of the tube at a feed rate of 24 ml/min. The IRC-718-Fe medium was introduced at the distal end at a rate of about 50 ml/min. Effluent Fe concentration at the distal end of the tube at steady state was 33,744 ppm.

EXAMPLE 15

This example describes displacement of Zn from IRC-718-Zn medium as obtained after selective removal of Zn from an EAD extract (Example 13). Using the tube, angle of inclination and shaking regimen of Example 1 and an rpm of 0.41, deionized water was input at the proximal end of the tube at a rate of 10 ml/min and 4.0N $H_2SO_4$ at a midpoint feed at a rate of approximately 39 ml/min. The IRC-718-Zn medium was introduced at the distal end of the tube at a rate of approximately 31 ml/min. The concentration of Zn in the effluent at the distal end after steady state conditions were achieved was approximately 18,583 ppm.

EXAMPLE 16

This example describes displacement of Cu from C-100-Cu medium. With the tube, angle of inclination and shaking regimen of Example 1 and a 0.5 rpm, deionized water was introduced at the proximal end of the tube at a rate of about 28 ml/min and 4.0N $H_2SO_4$ at a midpoint feed at a rate of about 27 ml/min. Medium was introduced into the distal end at a feed rate of approximately 25 ml/min. The concentration of Cu in the effluent from the distal end at steady state was about 20,945 ppm.

EXAMPLE 17

In this example, the ability to remove Se from a highly alkaline industrial waste solution (pH 12.65) by the screw tube process is demonstrated. This is accomplished with a general-use anion exchanger in the $OH^-$ form and/or the $SO_4^=$ form. The selenium is readily exchangeable with either anion on the medium. In the case of an $OH^-$ form of the anion exchangers (e.g., A-100-OH Purolite), the Se anion is not significantly favored over $OH^-$ or $SC_4^=$ by the positively charged site on the medium. Moreover, the selenium anion on the A-100 can be easily removed by either $OH^-$ during regeneration. In the following example, the concentration of selenium anion in the input solution is 86 mM, whereas the competing hydroxyl ion is approximately 400 mM.

The principle behind this example is of particular utility in those cases where the concentration of one component (x) in a solution greatly exceeds another component (y) in the same solution, and both x and y interchange freely with a given site on a medium. If the medium is introduced into the system preloaded with x, then the effect will be an exchange of x for y. Although y may go on the medium in exchange for x, y can also be removed from the medium by x. This exchange will result in an equilibrium being established so that at any given point in time, the concentration of y in the liquid phase will be lower than the input solution containing x and y. On the other hand, the concentration of x in the solution surrounding the medium will remain essentially unchanged or be slightly higher due to the smaller amount of y component that has exchanged for x on the medium. If the solution is then separated from the medium and exposed to another volume of medium pretreated with x, or one having a lesser amount of y on it than the previously exposed medium, a new equilibrium will once again be established between the y in the solution and y in the medium. The result will be an increase of y on the medium and a decrease in the concentration of y in the solution.

As the water and medium in each turn of the screw tube separate from the water and medium of each other turn, the passage of the x,y solution through the tube will result in a lowering of y concentration in each subsequent turn. The number of turns required is dictated by the concentration of x and y. In effect, the passage of y down the tube is delayed relative to x because the y in the solution is in a state of constant exchange with x on the medium. When the tube is rotated at the proper rpm, the observed result appears to be a movement of the bulk of the component y up the tube relative to the downward flow of x. Therefore, the passage of a solution of x and y, as described above, through a slowly rotating tube with sufficient turns will progressively lower the concentration of y until it is undetectable, without changing greatly the concentration of x.

In the case of a solution containing x ($OH^-$) and y ($SeO_4^=$), it may be desirable to remove all detectable y ($SeO_4^=$) but only sufficient x ($OH^-$) so that the effluent from the tube after treating the solution is near neutrality in pH. This is accomplished by pretreating the medium so that a portion of the sites are occupied by $SO_4^=$ and the remainder by $OH^-$. The exact amounts of each will determine the pH of the effluent. Therefore, as the $SO_4^=$, $OH^-$ treated medium enters the distal portion of the tube, OH. in the solution will displace $SO_4^=$ effectively lowering the pH of the effluent. As the medium proceeds up the tube, progressively more $SO_4^=$ is removed. The $SeO_4^=$ in solution coming down the tube will primarily displace OH. from the medium. By this method, the $SeO_4^=$ is effectively removed from the water and the effluent pH can be maintained within a range acceptable for immediate discharge.

To remove the selenate from the medium, an alkaline or acid $SO_4^=$ solution may be used, the acid being preferred. The concentration of Se during its removal from the medium is enhanced by the passage of large quantities of medium through small volumes of regeneration solution, as described in connection with recirculation of dump solution. After the $SeO_4^=$ is concentrated as a result of its removal during regeneration of the medium, it may be removed effectively from an acidic solution by means of electroreduction (for example, 20 amps/ft$^2$ of cathode; pressed carbon or platinized titanium anodes). Se is reduced at the cathode as a red, amorphous metal which can be removed by scraping.

The "delay" protocol described in Example 17 for selenate separation is also useful in the separation of metals from acid solutions, such as spent pickling liquors as shown in Example 5 above. In Example 5, the results are obtained by the "delayed" passage of metals ($Fe^{+++}$, $Pb^{++}$, $Zn^{++}$) down the tube relative to the protons ($H^+$). In effect, the $H^+$ plus $Cl^-$ in the pickling solution are purified and exit the distal end of the tube, whereas the metal contaminants end up on the medium and exit the proximal end of the tube.

Two tubes as described in Example 1 were employed in series for selenate removal, so as to provide in effect a single tube with 48 turns of the screw. The angle of inclination of each tube and the shaking regimen for both tubes were as described in Example 1; the rpm for both tubes was 2.0. A $SeO_4^=$ solution (pH 12.65) was introduced into the proximal end of tube #1 at a feed rate of about 45 ml/min. The feed rate of A-100-$SO_4^=$ medium at the distal end of tube #2 was approximately 90 ml/min. The Se concentration in the influent solution was about 8800 ppm; after a treatment of approximately 6 hours duration, the Se concentration in the effluent from the distal end of tube #2 was <1 ppm.

EXAMPLE 18

This example describes the removal of the organic colorant component from a lignin-containing waste solution obtained after treatment of raw materials in a pulp and paper plant. With the tube, angle of inclination and shaking regimen of Example 1 and a 0.5 rpm, a brown waste solution (pH 10) was introduced into the proximal end of the tube at a rate of 150 ml/min. Medium (A-100-OH) was introduced into the distal end of the tube at a feed rate of about 20 ml/min. Whereas the optical density of the influent solution (520 nm) was 0.69, the optical density of the treated effluent was <0.05. Moreover, the used medium was determined to have been loaded with organic material at a concentration of >70 g organic material/1 medium.

EXAMPLE 19

This example describes regeneration of the medium employed in Example 18. Using the tube, angle of inclination and shaking regimen of Example 1 and a 2.0 rpm, 4.0N NaOH was introduced into the proximal end of the tube to a feed rate of about 35 ml/min. The loaded medium was introduced at the distal end of the tube at a rate of about 80 ml/min. By extrapolation of the optical density from dilute solutions, the OD of the effluent was approximately 8.9 (520 nm), a concentration of about 13-fold. Following treatment, the medium is ready for re-use.

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation.

What is claimed is:

1. Apparatus for removal of at least one contaminant from a liquid, comprising:

helicoidal screw means for moving a contaminant affinity medium in a first direction;

liquid conduit means comprising a tube enclosing said helicoidal screw means for moving said liquid in a second, opposite direction from a first end of said tube to a second, opposite end thereof while in contact with said contaminant affinity medium, said contact being sufficient to permit formation of an association between said solid contaminant affinity medium and said at least one contaminant, movement of contaminant affinity medium from said second end of said tube to said first end in a direction countercurrent to flow of liquid being effected by relative rotation of said helicoidal screw means and said liquid conduit means;

means for separating said contaminant affinity medium from said liquid at said first end of said tube; and feedback pump means for returning liquid separated from contaminant affinity medium at said first end of said tube back into said tube at said first end thereof, said feedback pump means having a rate matching or exceeding a rate of initial liquid introduction into said tube.

2. Apparatus according to claim 1, wherein said helicoidal screw has a void center from end to end throughout said tube.

3. Apparatus according to claim 1, wherein the helicoidal screw is attached at its external circumference to an internal surface of the tube, whereby a continuous path is formed from one end of the tube to a second, opposite end.

4. Apparatus according to claim 1, wherein the tube is maintained at an angle of between about 0° and about 45° from the horizontal.

5. Apparatus according to claim 1, wherein the tube is maintained at an angle within the range of about 4° to about 20° from the horizontal.

6. Apparatus according to claim 1, wherein said helicoidal screw means and said liquid conduit means are adapted to permit relative rotation of said tube and said helicoidal screw at a rate on the order of about 0.1 to about 10 rpm.

7. Apparatus according to claim 1, wherein said helical screw comprises two to about 48 turns.

8. Apparatus according to claim 1, wherein said helicoidal screw means and said liquid conduit means are adapted to accommodate a volume/volume ratio of contaminant affinity medium to liquid within the range of approximately 5% contaminant affinity medium and approximately 77% contaminant affinity medium.

* * * * *

UNITED STATES PATENT AND TRADEMARK OFFICE
CERTIFICATE OF CORRECTION

PATENT NO. : 5,089,123
DATED : February 18, 1992
INVENTOR(S) : Irving W. DeVoe

It is certified that error appears in the above-identified patent and that said Letters Patent is hereby corrected as shown below:

Col. 9 line 16 Xml should be underlined;

Col. 9 line 18 Xml should be underlined;

Col. 11 line 44 change "!8" to -- 18 --;

Col. 12 line 67 change "Calif." to -- California --;

Col. 16 line 34 after "recovered" add -- from --;

Col. 21 line 64 replace "$SC_4^=$" with -- $SO_4^=$ --;

Col. 21 line 66 after "$OH^-$" add -- or $SO_4^=$ --;

Col. 22 line 53 replace "OH." with -- $OH^-$ --; and

Col. 22 line 57, replace "OH." with -- $OH^-$ --.

Signed and Sealed this

Twenty-ninth Day of June, 1993

Attest:

MICHAEL K. KIRK

*Attesting Officer*     Acting Commissioner of Patents and Trademarks